United States Patent [19]

Herr

[11] Patent Number: 4,595,110
[45] Date of Patent: Jun. 17, 1986

[54] TAMPER-EVIDENT CLOSURE

[75] Inventor: James E. Herr, East Petersburg, Pa.

[73] Assignee: Kerr Glass Manufacturing Corporation, Los Angeles, Calif.

[21] Appl. No.: 705,543

[22] Filed: Feb. 26, 1985

Related U.S. Application Data

[63] Continuation of Ser. No. 467,873, Feb. 18, 1983, Pat. No. 4,506,795.

[51] Int. Cl.⁴ .............................................. B65D 41/34
[52] U.S. Cl. .................................................. 215/252
[58] Field of Search ........................................ 215/252

[56]  References Cited

U.S. PATENT DOCUMENTS

| | | | |
|---|---|---|---|
| 4,407,422 | 10/1983 | Wilde et al. | 215/246 |
| 4,418,828 | 7/1981 | Wilde et al. | 215/252 |
| 4,469,234 | 9/1984 | Deussen | 215/252 |

FOREIGN PATENT DOCUMENTS

| | | | |
|---|---|---|---|
| 49876 | 4/1982 | European Pat. Off. | 215/252 |
| 56-74445 | 6/1981 | Japan | 215/252 |

Primary Examiner—Donald F. Norton
Attorney, Agent, or Firm—Fitch, Even, Tabin & Flannery

[57]  ABSTRACT

A tamper-evident closure is provided which includes a threaded cap and tamper-indicating means having upwardly and inwardly folded tabs which lock against the lower surface of an annular shoulder on a container neck to retain the tamper-indicating means on the neck as the cap is removed. The tamper-indicating means includes a ring to which the tabs are integrally connected at their lower outer ends. The tabs are resilient and are flexed by the container finish at the joints where they are joined to the ring. The closure of the present invention may be installed simply by screwing it onto a container neck in a one-step process. The flexible tabs assist in guiding the closure and centering it as it is lowered onto the container neck for installing and do not require the holding of the closure or the container finish to close tolerances in order to be consistently effective. The method of manufacturing the closure of the present invention includes the steps of molding a plastic blank which includes a cap, a ring, and tabs extending vertically downwardly from the ring; bending the tabs radially inward and upward; and heating the folded joints formed where the tabs are bent upward from the ring to set the tabs in their upwardly and inwardly inclined positions.

1 Claim, 8 Drawing Figures

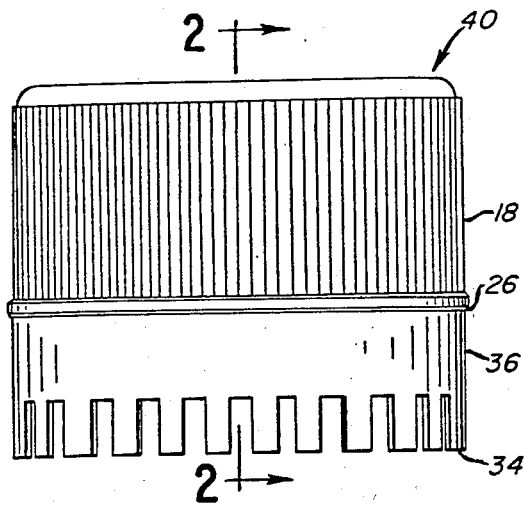
FIG. 1
FIG. 2
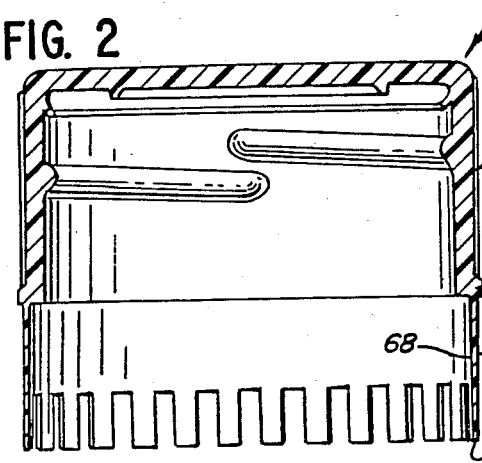
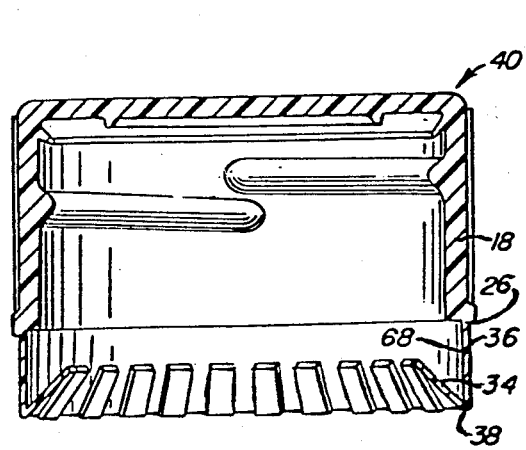
FIG. 3
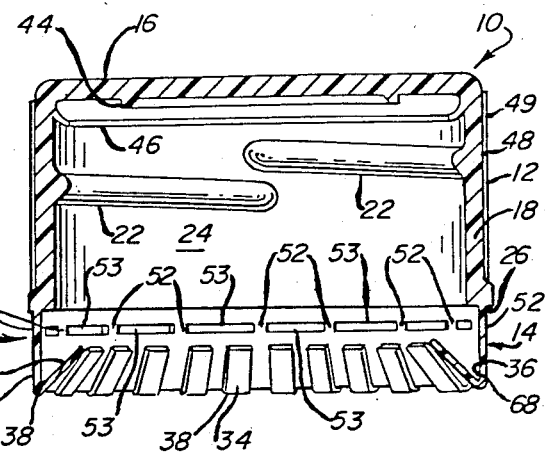
FIG. 4
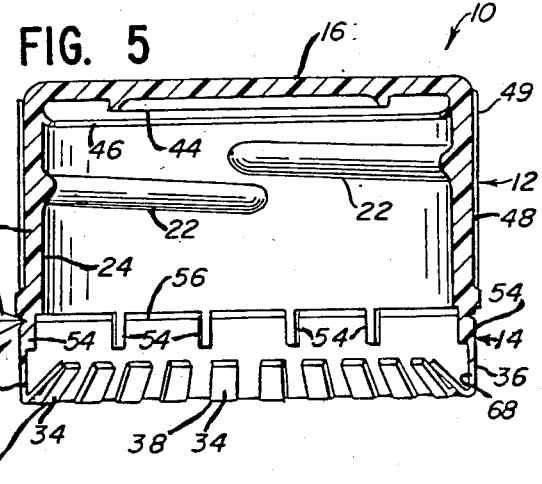
FIG. 5
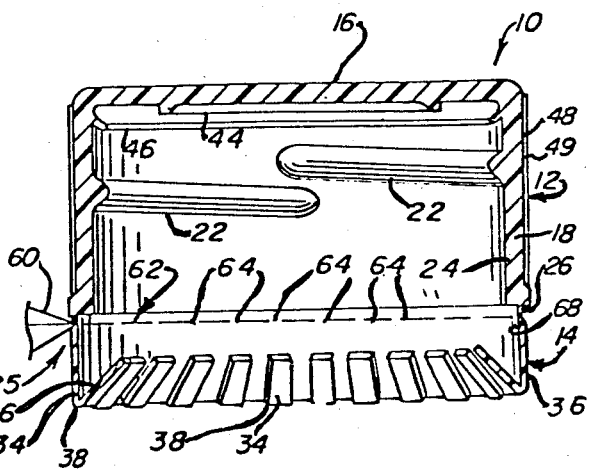
FIG. 6

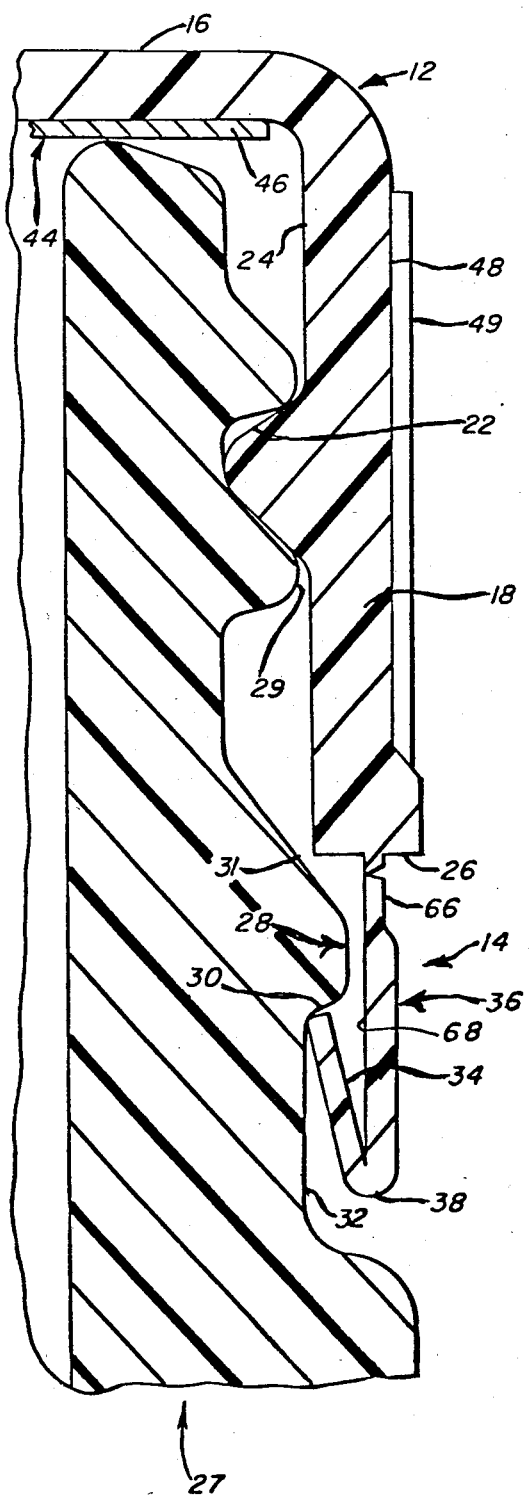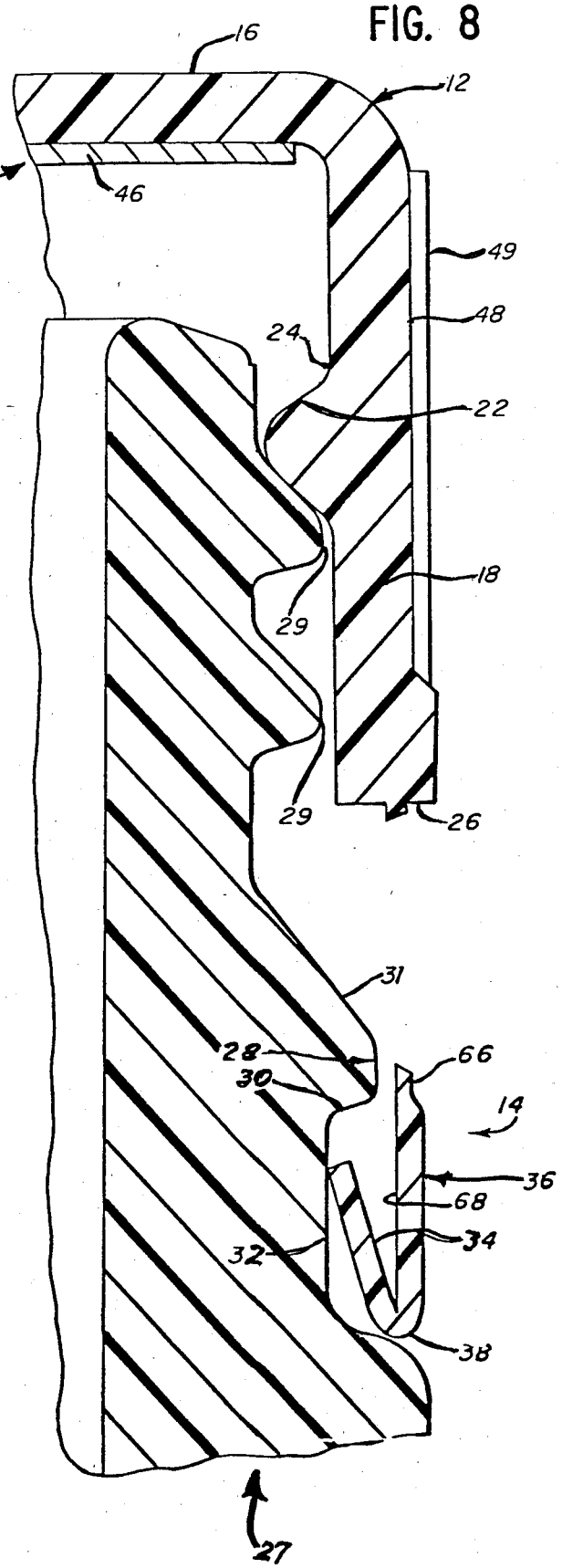

TAMPER-EVIDENT CLOSURE

This is a continuation application of application Ser. No. 467,873 filed on Feb. 18, 1983 and now U.S. Pat. No. 4,506,795.

The present invention relates to a tamper-evident closure and a method for manufacturing it.

Tamper-evident closures of various types have been used in the past on containers to enable the user of a product to determine whether the container has been opened. Such closures have commonly been made of aluminum or plastic. One type of closure includes an upper cap portion and a lower security ring or band which is attached to the cap portion by a failure line. When the cap is removed, the closure breaks along the failure line, leaving the ring separate from the cap portion. Often the security ring is heated and rolled under a shoulder of the container; plastic closures of this type are described in U.S. Pat. Nos. 3,673,761 and 4,033,472.

U.S. Pat. Nos. 4,343,408 and 3,329,295 disclose one piece molded plastic closures which are to be applied to the container without the use of heat or the use of a secondary operation during the capping of the containers. In these closures, the lower security band carries a bead which is stretched and flexed over a large diameter shoulder on the container during the capping operation. After passing the shoulder, the bead contracts under the container shoulder to a lesser diameter. A weakened area above the bead is provided in the band to break when the closure is unscrewed. During this unscrewing the bead engages the underside of the shoulder and is held against upward travel placing the weakened area in shear to sever the band at the weakened area. In a some glass containers, the maximum diameter of the shoulder is only 0.008 inch greater than the maximum diameter of the screw thread. Since it is desirable that the bead diameter pass over the container screw thread and still have a substantial portion projecting under the container shoulder, this does not leave much distance for a large amount of bead to be located under the shoulder in the nominal conditions. The lack of bead engagement is particularly true in the worst tolerance case conditions where the glass shoulder is at a minimum tolerance diameter and the bead is at its maximum tolerance diameter.

Also, in worst tolerance case conditions where the bead diameter is the smallest and the shoulder diameter is largest, the resistance of the bead to stretching over the container shoulder may fracture the line of weakness resulting in the closure appearing to have been tampered with before its use. Of course, bottlers do not tolerate such a condition.

Also, the formation of the bead and skirt with the weakened area to separate the band from the cap in a one piece molded cap has given rise to problems in molding. The molds are relatively complex compared to the simple molds used to mold screw caps without tamperproof bands. Depending on the size of cap, some of the closures may be striped from the mold whereas for other sizes of closures the caps must be unscrewed from the molds.

Thus, it will be seen that existing container finishes present serious problems to the use of inexpensive one-piece closures which do not use a secondary operation during capping of the container and yet which function reliably on a commercial basis.

Accordingly, it is an object of the present invention to provide a new and improved tamper-evident closure which may be installed in a one-step operation, and which is able to adjust to dimensional tolerance variations.

It is a further object of the present invention to provide a tamper-evident closure with an indicator ring which consistently breaks away from a removable cap portion and drops down on the container finish to provide a readily discernible visual indication that the cap has been removed.

It is another object of the present invention to provide a tamper-evident closure which is readily manufactured to be cost competitive with other tamper-evident closures.

Additional objects and features of the present invention will become apparent from the following detailed description when viewed in connection with the accompanying drawings in which:

FIG. 1 is an elevational view of a molded blank from which the closure of the present invention is made;

FIG. 2 is an elevational sectional view taken substantially along line 2—2 in FIG. 1 and looking in the direction of the arrows;

FIG. 3 is an elevational sectional view showing the blank of FIG. 2 with the tabs bent upward and radially inward;

FIG. 4 is an elevational sectional view of an embodiment of the closure of the present invention wherein the breakable connector means is molded into the blank;

FIG. 5 is an elevational sectional view of an alternative embodiment of the present invention wherein the breakable connector means includes circumferentially spaced lugs;

FIG. 6 is an elevational sectional view of a second alternative embodiment of the present invention wherein the breakable connector means is formed by a slotted cutter;

FIG. 7 is a fragmentary sectional elevational view of a closure in accordance with the present invention shown in installed relation upon a container neck; and FIG. 8 is a fragmentary sectional elevational view of a closure in accordance with the present invention which has been partly unscrewed from the container neck so that the tamper-indicating means has broken away from the cap.

The present invention is generally embodied in a tamper-evident closure 10 for a container having an externally threaded neck and a method of manufacturing the closure. The closure 10 includes an internally threaded cap 12 and a tamper-indicating assembly 14 including a band or ring 36 detachably connected to the cap. The cap 12 includes a top wall 16 for extending across the open top of a container and an annular skirt or sidewall 18 integrally joined to the top wall about the periphery of the top wall and having a screw thread 22 formed on its inner surface 24 for engagement with a threaded container neck. The tamper-indicating assembly 14 is detachably connected to the lower periphery 26 of the sidewall 18 by breakable connector means 25. When the cap 12 is unscrewed from the container neck, the tamper-indicating assembly 14 is retained on the container neck by an annular container shoulder 28 and breaks away from the cap.

The container illustrated herein has a finish 27 with an annular shoulder 28 with an outer diameter larger than the diameter of the threads 29. Top surface 31 of the shoulder is sloped downwardly and outwardly. A lower surface 30 for the shoulder is tapered slightly upwardly and outwardly. The lower shoulder surface 30 provides a stop surface to hold the lower ring 36 to cause it to detach, as will be explained in detail hereinafter. A neck surface 32 below the shoulder 28 has a smaller diameter than the shoulder, and the differences in diameters for the neck surface and the outer shoulder diameter may be varied substantially. Herein, the neck surface is illustrated as being substantially vertical. To assist in having the ring 36 drop down to the FIG. 8 position, the neck surface 32 may be made to taper downwardly and inwardly to provide a smaller diameter at the lower end of the neck surface 32 than at the top end of the neck surface 32.

In the past, some tamper-evident closures have been installed in two-step processes involving screwing the closure onto the container and subsequently applying forces or heat to force the tamperproof band on the closure under an annular shoulder on the container. Others have been installed in one-step processes but have required relatively close tolerances to be maintained in manufacturing of the closure and of the container neck or have required a shoulder having a substantially horizontal lower surface or having a substantially larger diameter than the neck surface below it. Manufacturers of glass bottles and bottlers have large investments in existing equipment and they do not readily agree to changes in the container finish as might affect their existing equipment and procedures. There is a need for a reliable tamper-evident closure which can be installed on a container neck with conventional closure applying equipment in a one-step operation and which can be used with conventional neck finishes such as that described above and yet provide a break-away band or ring 36 on the container under the various tolerance conditions to show that the cap has been unscrewed.

In accordance with the present invention, a tamper-evident closure 10 is provided which employs pivotal, resilient tabs 34 which lock against the lower surface 30 of the annular shoulder 28 to retain the tamper-indicating assembly 14 on the container neck as the cap 12 is removed. The preferred tabs 34 are integral with the ring 36 and extend radially inward and upward from the generally cylindrical ring 36 and are resiliently urged against the finish 27 as they are flexed inwardly at curved ends or joints 38 where they meet the band 36. As the cap 12 is removed, the upward force on the tamper-indicating assembly 14 tends to bow the tabs 34 inwardly against the neck surface 32 and to stiffen the tabs to cause them to engage more tightly and to grip the container neck. The closure 10 may be installed simply by screwing it downwardly onto the container neck, and the tabs 34 assist in guiding the closure as it is lowered onto the container neck for installation. That is, the tabs 34 serve as a cam guiding surface of large diameter at their lower ends to center the cap onto the container finish. Because the tabs are so flexible they can readily be bent when the container and closure are not axially aligned on the same vertical axis. Also, the tabs readily flex past large diameter tolerances on the closure finish.

The action of the tabs 34 enables the closure 10 to perform reliably without requiring exceptionally low tolerances to be maintained in the manufacture of either the closure 10 or the container. The tamper-indicating assembly 14 slides a short distance down the neck to the position shown in FIG. 8 after being broken away from the cap 12 so that after replacement of the cap on the container, there remains a readily discernible visual indication that the container has been opened. This is in contrast to many other closures in which the tamperproof band merely splits or opens up and remains attached to the cap after its removal.

Obtaining the desired tab configuration requires a post-forming operation since conventional molding processes are not capable of producing a closure having the preferred tabs extending upward and inward as described above. In accordance with the method of manufacture of the present invention, the blank 40 (FIGS. 1-3) is molded with straight vertical tabs 34 extending downward (FIGS. 1 and 2). In another separate operation, the tabs are bent radially inward and upward, and heat is applied to the tab joints 38 to set the tabs in a configuration such as that shown in FIG. 3 after the tabs 34 have been bent inward and upward, as will be explained in detail hereinafter.

Turning now to a more detailed description of a preferred embodiment of the closure 10 of the present invention, the cap 12 herein is made of a moldable plastic material, such as polypropylene. A sealing means 44 shown herein in the form of a liner 46 is used for sealing engagement with the container neck are formed on the top wall 16 and sidewall 18 of the cap 12. Manifestly, an integral fin on the cap may be provided as sealing means in lieu of the liner 46. The the closure skirt or sidewall 18 has a generally cylindrical exterior 48 with a plurality of equally spaced vertical ribs 49 formed to facilitate gripping of the cap.

In the embodiment illustrated in FIG. 4, the tamper-indicating assembly 14 is connected to the cap 12 by a weakened area in the ring 36 and preferably in a location immediately below the lower end of closure skirt. The weakened area provides a severing plane normal to the closure and container axis at which the ring 36 will consistently detach from the upper cap when the closure is unscrewed. The weakened area may be made in various manners. For instance, in FIG. 4, a plurality of integral posts or strips 52 which are formed in the molding process join the ring 36 to the cap 12. The strips 52 are separated from one another by generally rectangular gaps 53 and are evenly spaced about the circumference of the ring 36. This embodiment doesn't require any post operation of cutting of the band to form the strips 52.

FIG. 5 illustrates an alternate construction wherein a plurality of lugs 54 are molded to provide increased wall thickness and to extend radially inwardly from the remainder of the ring 36 which is connected to the lower periphery 26 of the cap sidewall 18. A knife 55 is used in a post molding operation to make a cut 56 through the thin cross section of the ring 36 but not through the inwardly positioned and thicker cross section posts or lugs 54. Thus, the cut 56 separates the ring 36 from the sidewall 18 so that only the lugs 54 connect the ring to the sidewall.

In a third embodiment, shown in FIG. 6, a slotted cutter 60 is used to form an intermittent circumferential cut 62 about the upper portion of the ring 36, leaving a plurality of circumferentially spaced portions 64 intact. In this FIG. 6 embodiment, as well as the others, the knife cut need not be completely through the sidewall as would leave a space or gap between opposite vertical sides of the cut. The cap may be on a mandrel with the knife cutting the sidewall but leaving a small inner thin web of material adjacent the mandrel on which the cap rests.

In order to enable the ring 36 to break away cleanly during removal of the cap 12, it is desirable that the ring be strong enough to resist distortion or breakage as the cap 12 is removed from the container. It is also desirable in the embodiments illustrated in FIGS. 5 and 6 that the knife 55 or cutter 56 be able to cut through the ring 36 fairly easily. Accordingly, in the embodiments illustrated in FIGS. 5 and 6, the ring 36 has a relatively thick cross section over most of its area and has a circumferential indentation or groove 66 (FIGS. 7 and 8) formed about its upper periphery adjacent the lower periphery 26 of the cap sidewall to enable the knife 55 or cutter 56 to locate the cut precisely at the same area on each of the caps and also to facilitate the cutting action. The thickness of the indented portion 66 is preferably about 0.01 inches, and the thickness of the remainder of the ring 36 is preferably about 0.02 inches. Each of the tabs 34 in the illustrated embodiments has a generally rectangular shape with generally uniform width and thickness over its entire length. In an alternate embodiment which is not illustrated herein, the tabs are tapered, decreasing in width and increasing in thickness toward their free ends. This tab configuration may enable the tabs to remain somewhat more rigid than rectangular tabs of uniform thickness when they are locked against the lower shoulder surface, which may enable the ring to break away more cleanly. By way of example, the illustrated tabs may be about 0.144 inch in the circumferential direction with the tabs being about 0.125 inch in length. About twenty tabs are provided on a 28 mil. cap. The tab thickness in the radial direction may be about 0.036 inch.

Turning now to a description of the method of the present invention, closures 10 in accordance with the preferred embodiment of the present invention may be formed according to one of three methods. Each of the methods includes the steps of molding a closure blank 40 (FIGS. 1–3) wherein the tabs 34 are formed extending downwardly, and subsequently deforming the tabs 34 so that they extend inward and upward from the ring 36. The methods differ in the way the ring 36 is made detachable from the cap 12, as explained in greater detail below.

Molding of the blank 40 may be accomplished by any well-known molding process, such as injection molding, with any of a variety of suitable plastic materials, such as polypropylene. After the blank 40 has been removed from the mold, the tabs 34 are mechanically bent radially inward and upward, about the joints 38 where the tabs 34 meet the ring 36. Due to the elasticity of the plastic material, the tabs 34 tend to return toward their original, downwardly extending configuration once the bending force is removed. It has been found that if the tabs 34 are bent upward and then released, they tend to return to approximately horizontal or downwardly sloping positions. However, it is desirable that the tabs extend upwardly rather then horizontally or downwardly prior to installation of the closure on a container so that the tabs aid in centering the closure as it is lowered onto the container neck.

In accordance with the present invention, the heat is applied to the joints 38 while the tabs 34 are held in an upwardly bent position. The heat should not melt the joints but does have an effect on the "memory" of the plastic tabs so that the residual stresses in the plastic at the joints does not swing the tabs downward to the horizontal position. That is, the heat applied to the joints 38 reduces the tendency of the tabs 34 to spring back to the horizontal and the tabs remain in an upwardly extending position after the heat and bending forces are removed. In the preferred method, the tabs are bent upward and pressed against the interior 68 of the ring 36, then heated and released. This sets the tabs 34 at an upward orientation so that an included angle of about 45° is defined between a tab and the adjacent ring interior 68. Manifestly, the angle of the tabs may be varied considerably from 45°.

FIG. 4 illustrates a closure wherein a plurality of gaps 53 are formed about the circumference of the ring 36 when the blank for the closure is molded so that the ring is connected to the cap sidewall 18 by molded strips 52. The molding of the closure in this way avoids the step of subsequently making a knife cut about the circumference of the closure.

FIG. 5 illustrates a closure wherein lugs 54 are molded into the blank to connect the ring 36 to the sidewall 18. A knife 55 makes a continuous circumferential cut 56 through the ring 36 adjacent the lugs so that detachment of the ring may be accomplished by breaking the lugs. The lugs may have various dimensions, but herein are about 0.020 inch wide and have a radial thickness of about 0.025 inch. The heat is applied to the joints 38, as above described.

FIG. 6 illustrates a closure wherein an intermittent circumferential cut 62 is made through the ring by a slotted rotary cutter 60.

As the closure 10 is installed on a container neck, the tabs 34 are forced radially outwardly toward the ring interior 68 by the neck finish. The tabs 34 are thus flexed from their normal relaxed position and urge their distal radially inward to engage and grip the neck. When the cap 12 is later removed, the tabs 34 lock against the lower surface 30 of the annular shoulder 28. The elastic behavior of the tabs 34 enables the tabs to pivot inward to compensate for variations in the sizes of the closure 10 and the neck finish 27.

In some known tamper-evident closures adaptable for one-step installation, the annular shoulder on the container is configured to permit a molded ring to pass downward over it for installation and restrain the ring from passing back upward. If the shoulder diameter is too large or the ring diameter is too small, the ring may not be forced downward over the shoulder without breaking of the weakened area or of the band. If the shoulder diameter is too small or the ring too large, the ring may be able to pass upwardly over the shoulder, either without breaking or with breaking and remaining attached to the cap whereas for tamper-indicating function of the closure it is preferred that the ring separate from the cap and drop down on the container finish. The gripping action of the tamper-indicating assembly 14 of the present invention enables it to accommodate such dimensional variations so that molding tolerances are less critical for both the closure and the container neck.

From the foregoing, it will be appreciated that an improved tamper-evident closure and a novel method of manufacturing this closure are provided by the present invention. While certain embodiments of the present invention have been shown and described herein, there is no intent to limit the invention by these descriptions. The invention extends to all modifications and alternate constructions falling within the spirit and scope of the appended claims.

What is claimed is:

1. A tamper-evident closure for sealing an open-topped container having an external screw thread formed on a neck on the container and an outwardly projecting annular shoulder formed below the screw thread, the closure comprising:

an internally threaded cap which may be removed from the container for dispensing the contents of the container, the cap comprising a top wall for extending across the open top of the container, an annular sidewall integrally joined to the top wall about the periphery of the top wall and depending therefrom, and an internal screw thread formed on the inside of the sidewall for engagement with the external screw thread on the container, and tamper-indicating means comprising a ring depending from the annular sidewall, said ring being located axially in vertical alignment with said sidewall and radially substantially within the confines of the sidewall so that downward forces during a capping operation do not separate the ring from the cap, said ring having an inner diameter greater than the outer diameter of said shoulder to pass axial therepast during a capping operation, a frangible slit section of reduced cross section in the upper portion of said ring to form breakable connections aligned vertically with the closure annular sidewall for detachably securing the ring to the sidewall, and a plurality of flat tabs bent upward and radially inward from the lower edge of the ring at a folded portion with inner ends of the tabs being disposed radially inwardly of the outer diameter of the shoulder, said upwardly and inwardly inclined tabs being positioned to center the closure relative to the container, said folded portions of said tabs being located at the bottom edge of said ring and being located in vertical alignment with said annular side wall, said inner ends of said tabs being flexed radially outwardly by the shoulder to slide past the shoulder during a capping operation and flexing radially inwardly about the folded portion and to positions for engaging the annular shoulder of the container during removal of the cap to prevent the tamper-indicating means from traveling upward beyond the annular shoulder with the cap and to break the ring away from the cap.

* * * * *